Figure 1:
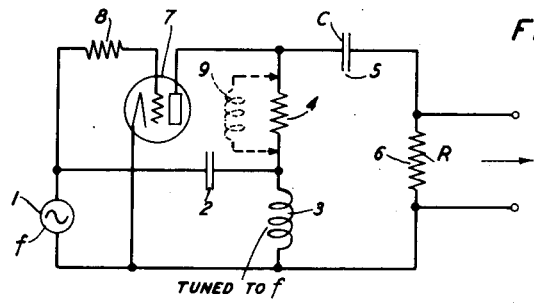

Sept. 26, 1939.  E. PETERSON  2,174,165
ALTERNATING CURRENT WAVE PRODUCTION
Filed Nov. 3, 1938

INVENTOR
E. PETERSON
BY
ATTORNEY

Patented Sept. 26, 1939

2,174,165

UNITED STATES PATENT OFFICE 2,174,165

ALTERNATING CURRENT WAVE PRODUCTION

Eugene Peterson, New York, N. Y., assignor to Bell Telephone Laboratories, Incorporated, New York, N. Y., a corporation of New York Application November 3, 1938, Serial No. 238,587

4 Claims. (Cl. 172—281)

The invention relates to the generation of alternating current waves and particularly to the generation of a number of waves of different frequencies by derivation from a single wave of a given frequency.

Heretofore, it has been found desirable in transmission systems in which a large number of waves of different frequencies are required, for example, for frequency standardization or for the carrier waves for the different channels of a multiplex carrier telephone system, to obtain these waves simultaneously by distorting an alternating current wave of a base frequency by a wave distorting device, such as a saturable magnetic core coil or a thermionic vacuum or gas-filled tube, to produce harmonics of that frequency. In many systems of this type it has been found that the amplitudes of the harmonics decrease very rapidly as their positions in the harmonic scale rise.

It is an object of the present invention to derive a number of alternating current waves of different frequencies having uniform amplitudes and of substantial power over a wide frequency range from a single wave of a given base frequency.

A more specific object is to produce from a wave of a given base frequency a large number of harmonics thereof having uniform amplitudes and relatively high power levels over a wide frequency range.

These objects are attained in accordance with the invention with a circuit arrangement employing a gas-filled electron discharge tube to properly time the charge and discharge of a capacity-resistance circuit. In one embodiment, a condenser and a resistance, which may be a resistive load circuit, are connected in series in the output circuit of the gas-filled tube, and an alternating current wave of a given base frequency is applied both to the tube output circuit in such manner as to charge the condenser to a definite potential, and to the control grid of the tube to cause ionization therein to discharge the condenser through the tube during a portion of each cycle of the applied wave. By proper adjustment of the relative phases and amplitudes of the plate and control grid voltages under proper circuit conditions, a relatively sharp impulse wave is produced in the output circuit of the tube, allowing harmonics of the base frequency having uniform amplitudes and at substantial power levels over a wide frequency range to be taken off from the resistance in that circuit.

The various objects and features of the invention will be understood from the following detailed description thereof when read in connection with the accompanying drawing in which:

Fig. 1 shows schematically a harmonic producing circuit embodying the invention; and Figs. 2 to 5 show curves illustrating the operation of and experimental results obtained with circuits embodying the invention.

In the circuit of the invention shown in Fig. 1, an alternating current wave source 1 of the fundamental frequency $f$ is connected across a resonant circuit comprising the condenser 2 and the inductance 3 in series, tuned to that frequency. The terminals of the inductance 3 are connected through the series resistance 4 across a circuit comprising the condenser 5 and the resistive impedance 6 in series, the latter circuit being connected in shunt with the plate and cathode of the three-electrode gas-filled electron discharge tube 7. The source 1 is also connected across the control grid and cathode of the tube 7 through the series current limiting resistance 8.

The wave of frequency $f$ from the source 1 flowing through the series resonant circuit 2, 3 develops a voltage across the inductance 3, which charges the condenser 5 through the resistances 4 and 6 at a rate determined by the circuit constants. The alternating wave from the source 1 is also impressed on the control grid of the tube 7 through the resistance 8.

Figure 2:
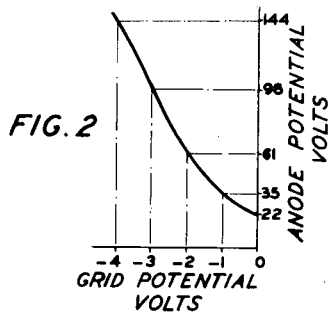

The firing time of the gas-filled tube 7 is adjusted by suitable selection of current constants, so that ionization will occur in the tube at a point near the peak of the voltage wave impressed upon the condenser 5 and resistance 6 in the output circuit of the tube. This time is determined largely by the relative phases of the grid and plate potentials of tube 7 and, to a lesser extent, by their relative amplitudes. The factors controlling the firing time of tube 7 are illustrated in the curve of Fig. 2 which represents the relation between the anode and grid potentials of the tube required to start the discharge, and in the curves of Fig. 3 which show the grid potential $V_g$ and plate potential $V_p$ of tube 7 and the input voltage $V_1$ as functions of time.

Figure 3:
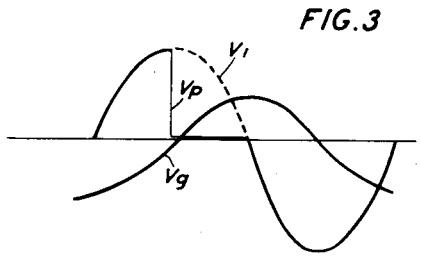

When the plate of the gas-filled tube 7 goes positive and the grid potential reaches the firing value, the gas-filled tube breaks down as indicated by the sharp drop in plate potential $V_p$, Fig. 3. When the tube 7 ionizes, condenser 5 discharges through the discharge path of the tube and the load resistance 6 producing a pulse in the latter which rises almost vertically at the start and then falls away exponentially at a rate determined by the product of the capacity of condenser 5 and the resistance value of resistance 6. When the tube 7 ionizes, the charging circuit for the condenser 5 is effectively short-circuited through the discharge path of tube 7 so that the condenser 5 will no longer receive a charge. The input voltage to tube 7 after ionization therein then decreases toward the negative cycle; this allows a substantial portion of the cycle for the tube 7 to deionize. The harmonics of the fundamental frequency taken off from resistance 6 may be separated in any suitable manner by the use of parallel filters or tuned circuits (not shown) respectively tuned to the different harmonics.

Additional factors which may affect the form of the discharge pulse produced in the resistance 6 are incidental circuit inductance as well as the processes required for ionization and deionization of the gas-filled tube. Preferably the source 1 is selected so that it will apply a sufficiently high alternating current voltage to the control grid of the tube 7 so that after the tube has been ionized the grid will swing so far negative as to cause the tube to be deionized in time to function on the succeeding cycle. Where the input voltage was raised to a point comparable with the plate voltage, it was found that very sharp pulses could be obtained.

Figure 4:
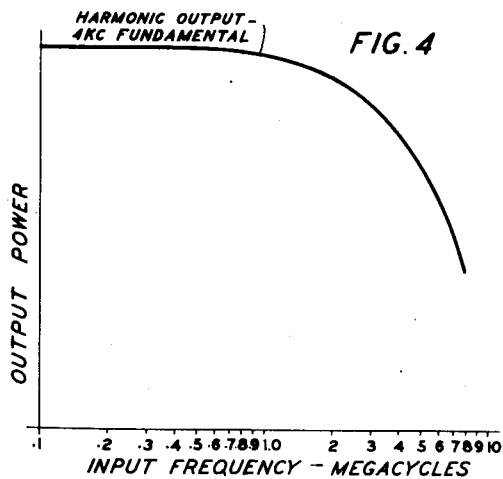

The harmonic distribution obtained with an experimental circuit substantially as shown in Fig. 1 employing a Western Electric 338–A gas-filled tube for the tube 7 and a fundamental input of 4 kilocycles from the alternating current source 1 is shown in Fig. 4. This distribution was obtained with circuit elements arbitrarily chosen. For the case illustrated, the value of condenser 5 was chosen as 50 mf. and of resistance 6 as 300 ohms. It will be noted from the curve that uniform amplitudes were obtained for harmonics ranging from the first to the one-hundred-and-fiftieth. Similar uniformity was obtained with this experimental circuit employing fundamental inputs of 10 kilocycles and 23 kilocycles with different values for condenser 5 and resistance 6. In the case of the 10 kilocycles input, the value arbitrarily chosen for condenser 5 was 0.001 mf. and that for resistance 6 was 300 ohms, and for the 23 kilocycles input the value chosen for condenser 5 was 20 mf. and the value for resistance 6 was 500 ohms. For higher input frequencies, up to hundreds of kilocycles for example, the number of harmonics with substantially constant amplitudes obtained is reduced somewhat. The optimum values of the circuit elements for different fundamental inputs and different gas-filled tubes can be readily obtained by experiment.

On the assumption of a vertical rise and an exponential decline for the discharge wave in resistance 6 the amplitude of the $n$th harmonic is found to be.

$$I_n = ARCp/\pi[1+(RCpn)^2]^{1/2}$$

where $R$ and $C$ are respectively the resistance of resistance 6 and the capacity of condenser 5, $A$ is the discharge peak current and $p$ represents $2\pi$ times the fundamental frequency.

Figure 5:
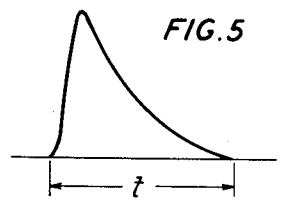

Wave forms of the discharge pulse using inputs ranging from 4 to 60 kilocycles observed by an oscillograph indicate that the initial rise of the pulse is exceedingly rapid and takes place in a time which on the average is less than one-microsecond, and the pulse duration is of the order of one-half microsecond. Fig. 5 shows the pulse which was obtained with a frequency input of 60 kilocycles, the duration $t$ of this pulse being approximately ¼ microsecond.

It has been found that when the value of the resistance 4 in the circuit of Fig. 1 is sufficiently reduced, the wave form observed is complicated by the presence of oscillations which arise in the gas-filled tube path. To limit these undesired oscillations, the resistance 4 in the circuit of Fig. 1 must be adjusted for the tube and operating conditions used; the value of resistance used being in the neighborhood of 2,000 ohms. Under these conditions, the reaction of the gas-filled tube and discharge circuit on the input mesh is exceedingly small.

Various modifications of the circuit of the invention illustrated and described within the spirit and scope of the invention will be apparent to persons skilled in the art. For example, an inductance 9 connected in shunt with the resistance 4 in the circuit of Fig. 1 as indicated in dotted lines, was found to improve the circuit from the standpoint of power dissipation.

It is to be understood that the values specified for the circuit elements in the circuit of the invention are to be taken by way of example only and not as limitations.

What is claimed is:

1. A harmonic producer comprising a gas-filled electron discharge device having an input circuit and an output circuit, a capacitor and a resistive impedance in series in said output circuit, a source of alternating current waves of a given base frequency, a circuit for charging said capacitor from said source, means also responsive to the alternating current waves from said source to periodically cause ionization in said device so as to allow said capacitor to discharge through the discharge path of said device and said resistive impedance during a part of each cycle of the applied wave, and means to take off from said output circuit harmonics of said given base frequency produced in said output circuit.

2. A harmonic producing circuit comprising a gas-filled space discharge device having a cathode, an anode and a control grid, an input circuit for said device including said cathode and said control grid, an output circuit for said device including a capacitor and resistive impedance in series connected between said cathode and said anode, means to apply an alternating current wave of a given fundamental frequency to said output circuit to charge up said capacitor to a definite potential, and to said input circuit to periodically cause ionization in said device so as to allow said capacitor to discharge through the space path of said device and said resistive impedance during a portion of each cycle of the applied wave, means to adjust the relative phase and amplitudes of the grid and anode voltages so that ionization occurs in said device near the peak of the voltage wave impressed upon said output circuit, whereby a very sharp impulse wave is produced in said output circuit, and means to take off harmonics of said fundamental frequency from said resistive impedance.

3. The harmonic producing circuit of claim 2, in which said alternating current wave is applied to said output circuit through a series resonant circuit comprising capacity and inductance in series tuned to said fundamental frequency, and the resultant voltage drop in said inductance is used to charge up said capacitor.

4. The harmonic producing circuit of claim 2, in which said alternating current wave is applied to said output circuit through a series resonant circuit comprising capacity and inductance, tuned to said fundamental frequency, the voltage developed across said inductance being used to charge said capacitor through said resistive impedance and a resistance of relatively large value connected in series with said inductance and said capacitor.

EUGENE PETERSON.